US011472244B2

(12) United States Patent
Murphy et al.

(10) Patent No.: US 11,472,244 B2
(45) Date of Patent: Oct. 18, 2022

(54) SKID PLATE WITH RECOVERY POINT

(71) Applicant: Honda Motor Co., Ltd., Tokyo (JP)

(72) Inventors: Nathaniel S. Murphy, Hilliard, OH (US); Kishan Kari, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 16/850,574

(22) Filed: Apr. 16, 2020

(65) Prior Publication Data

US 2021/0323364 A1 Oct. 21, 2021

(51) Int. Cl.
*B60D 1/48* (2006.01)
*B62D 25/20* (2006.01)

(52) U.S. Cl.
CPC ......... *B60D 1/488* (2013.01); *B62D 25/2072* (2013.01)

(58) Field of Classification Search
CPC .... B60D 1/488; B62D 25/2072; B62D 1/065; B62D 35/00; B62D 35/02
USPC ............. 296/180.1, 184.1; 293/117; 280/495
See application file for complete search history.

(56) References Cited

U.S. PATENT DOCUMENTS 3,869,061 A * 3/1975 Wanner ..................... E02F 9/02 976/DIG. 320
4,943,092 A 7/1990 Haraguchi
4,974,866 A * 12/1990 Morgan ................. B60D 1/363 280/477
5,246,244 A * 9/1993 Colibert ............. B62D 53/0828 280/901
5,791,633 A 8/1998 Walker
7,048,286 B2 5/2006 Eppelein
7,641,270 B2 * 1/2010 Takeda ................. B62D 21/152 296/203.02
7,753,396 B2 7/2010 Jamieson et al.
7,770,907 B2 8/2010 Shimizu et al.
8,297,638 B2 10/2012 Alguera et al.
8,333,162 B2 12/2012 Chapman et al.
8,474,844 B2 7/2013 Kwon et al.
8,540,269 B2 9/2013 Hembise et al.
8,602,394 B2 12/2013 Christiansen
8,668,245 B2 * 3/2014 Kakiuchi ............... B62D 35/02 296/180.1
8,839,901 B1 * 9/2014 Bradshaw .......... B62D 25/2072 180/346

(Continued)

FOREIGN PATENT DOCUMENTS

AT 396911 B * 11/1993 ............... B60D 1/02
DE 102010061135 A1 6/2012

(Continued)

OTHER PUBLICATIONS

Scharmueller, Josef; Description of "Coupling housing of a trailing coupling fortowing vehicles, in particular tractors"; Nov. 1993 (Year: 1993).*

(Continued)

*Primary Examiner* — Joseph D. Pape
*Assistant Examiner* — Veronica M Shull
(74) *Attorney, Agent, or Firm* — Plumsea Law Group, LLC

(57) ABSTRACT

A skid plate for a vehicle may include a continuous unitary plate of material including: a plurality of mounting points configured for mounting the continuous unitary plate to an undercarriage of a vehicle; and a recovery opening proximate an outer edge of the continuous unitary plate and configured to receive a device for recovering a vehicle.

18 Claims, 9 Drawing Sheets

(56) References Cited

U.S. PATENT DOCUMENTS

| | | | | |
|---|---|---|---|---|
| 9,238,394 | B2 | 1/2016 | Leibl | |
| 9,272,592 | B1 * | 3/2016 | Kringstad .............. | B60D 1/485 |
| 9,346,492 | B2 | 5/2016 | Oshima et al. | |
| 10,202,010 | B2 | 2/2019 | Huebel | |
| 10,279,849 | B1 | 5/2019 | Kirtland et al. | |
| 2013/0001986 | A1 | 1/2013 | Takenaka | |
| 2013/0200656 | A1 * | 8/2013 | Shimmell .............. | B62D 35/02 296/204 |
| 2014/0070562 | A1 * | 3/2014 | Inagaki .............. | B62D 25/2072 296/180.1 |
| 2015/0336615 | A1 * | 11/2015 | Lim ....................... | B62D 35/02 296/180.1 |
| 2017/0312805 | A1 | 11/2017 | Kim et al. | |
| 2017/0320710 | A1 | 11/2017 | Fretz | |

FOREIGN PATENT DOCUMENTS

| | | | |
|---|---|---|---|
| EP | 1966029 | B1 | 9/2010 |
| GB | 2566315 | A | 3/2019 |
| JP | 6147789 | B2 | 6/2017 |

OTHER PUBLICATIONS

Espacenet Machine Translation of DE Patent No. 102010061135 A1, Issued Jun. 14, 2012.

Espacenet Machine Translation of JP Patent No. 6147789 B2, Issued Jun. 14, 2017.

Espacenet Translation of the English langauge Abstract of FR2894927 published Jun. 22, 2007, the French counterpart to EP Patent No. 1966029 B1.

* cited by examiner

SKID PLATE WITH RECOVERY POINT

BACKGROUND OF THE INVENTION

The present disclosure is directed to a skid plate for a vehicle undercarriage and, more specifically, a skid plate having a recovery point.

Vehicles often include a skid plate removably attached to the undercarriage of the vehicle in order to protect various components of the vehicle, such as suspension components, driveline components, engine components, fuel system components, etc. Such protection is often sought for off-road driving. In addition, vehicles that drive off-road may also include a recovery point, which is a structurally robust location on the vehicle at which a rope, cable, or chain may be attached in order to tow the vehicle in the event it becomes disabled or stuck. In some cases, the recovery point may include a hook, loop, or ring that projects from a sturdy portion of the vehicle, such as the bumper, frame, chassis, etc.

In some cases, the recovery point may be a separate component than the skid plate. Such configurations require multiple components to make the vehicle off-road ready. In other cases, the recovery point may be attached to, or integrated with the skid plate. In either configuration, a hook, loop, or ring is a structural component which adds weight to the vehicle, and also takes up space. It can also be complicated to secure the hook, loop, or ring to sturdy portions of the vehicle in a manner that permits access for the cable around or through cosmetic portions of the vehicle, such as bumper covers. Further, the hook, loop, or ring may also be unsightly for certain types of vehicles. In other words, while certain vehicles (e.g., those with "off-road" styling) may include tow hooks etc. as part of their external aesthetic, for other types of vehicles it may not be desirable for the hook, loop, or ring to be seen as part of the aesthetics of the vehicle.

The present disclosure is configured to address one or more of the issues discussed above.

SUMMARY OF THE INVENTION

The present disclosure is directed to a skid plate having an integral recovery opening. For example, the recovery opening may be a D-shaped opening proximate an edge of the skid plate. In some embodiments, the recovery opening may have an edge liner on the outermost edge of the opening to prevent damage to recovery ropes or cables. In some embodiments, the skid plate may include a reinforcing plate fixedly attached about the recovery opening.

In one aspect, the present disclosure is directed to a skid plate for a vehicle. The skid plate may include a continuous unitary plate of material including: a plurality of mounting points configured for mounting the continuous unitary plate to an undercarriage of a vehicle; and a recovery opening proximate an outer edge of the continuous unitary plate and configured to receive a device for recovering a vehicle.

In another aspect, the present disclosure is directed to a skid plate for a vehicle. The skid plate may include a continuous unitary plate of material including: a plurality of mounting points configured for mounting the continuous unitary plate to an undercarriage of a vehicle; a recovery opening configured to receive a device for recovering a vehicle; and an edge liner that is substantially smooth and wrapped around at least a portion of a peripheral edge of the recovery opening.

In another aspect, the present disclosure is directed to a skid plate for a vehicle. The skid plate may include a continuous unitary plate of material including: a plurality of mounting points configured for mounting the continuous unitary plate to an undercarriage of a vehicle; a recovery opening configured to receive a device for recovering a vehicle; and a plurality of vent openings configured to provide cooling for a component of the undercarriage of the vehicle.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
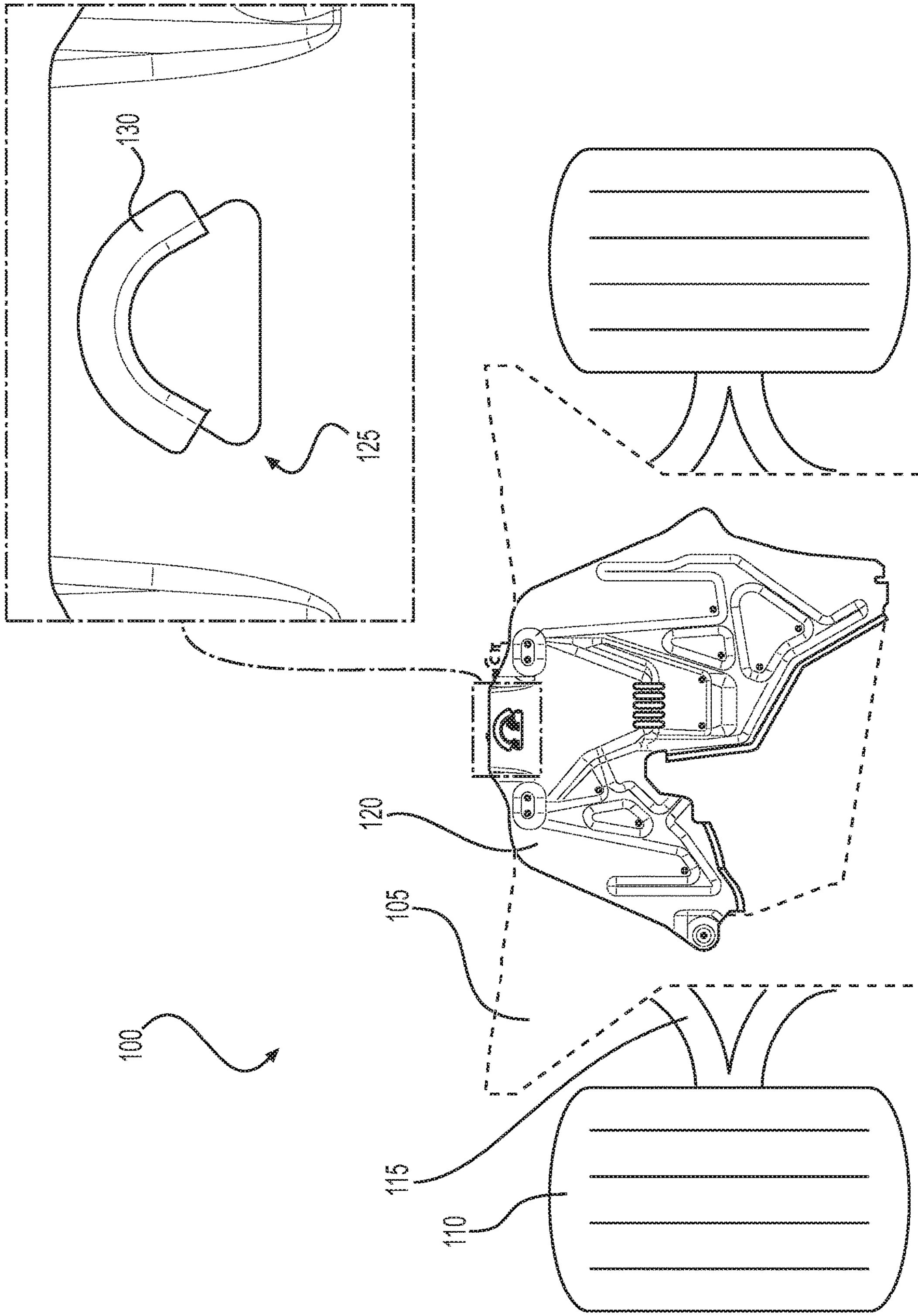
FIG. 1 shows a schematic illustration of a portion of a vehicle undercarriage with a skid plate mounted thereto.

FIG. 1 shows a schematic illustration of a portion of a vehicle undercarriage with a skid plate mounted thereto. As shown in FIG. 1, a portion of the underside of a vehicle 100 may include an undercarriage 105, to which tires 110 may be mounted, via suspension components 115. As further shown in FIG. 1, a skid plate 120 may be mounted to undercarriage 105.

Skid plate 120 may include a recovery opening 125 configured for attachment of a recovery device/equipment, such as a rope, cable, D-ring, etc., to recover vehicle 100 in the event it becomes disabled or stuck (e.g., in a ditch). It will be understood that, in some cases, the vehicle with opening 125 may be used as the recovery vehicle itself. For example, a cable or rope may be attached to opening 125 and to another vehicle, and the vehicle with opening 125 may be used to pull the other vehicle out of a ditch, etc. As shown in FIG. 1, in some embodiments, recovery opening 125 may have a substantially D-shaped configuration. In addition, recovery opening 125 may also include an edge liner 130, which is substantially smooth in order to protect recovery equipment, such as ropes or cables, from damage that might otherwise be caused by sharp edges of recovery opening 125.

The disclosed skid plate 120 may be utilized in any portion of undercarriage 105, including the front, rear, or other locations. In the present case, skid plate 120 is shown including features configured for beneficial use in a front region of a vehicle. For example, as discussed in further detail below, skid plate 120 may include air flow vents configured to provide cooling to under carriage components by allowing air flowing under the vehicle, while driving, to pass through skid plate 120. It will be understood, however, that skid plate 120 can be positioned anywhere on the undercarriage of a vehicle where recovery opening 125 may be utilized. In addition, it will be understood that a skid plate with one or more features included in skid plate 120 may be usable on any kind of vehicle, including passenger cars, trucks, and sport utility vehicles (SUVs), off-road vehicles, racing vehicles, all-terrain vehicles (ATVs), tractors, farming equipment, construction machines, etc.

Figure 2:
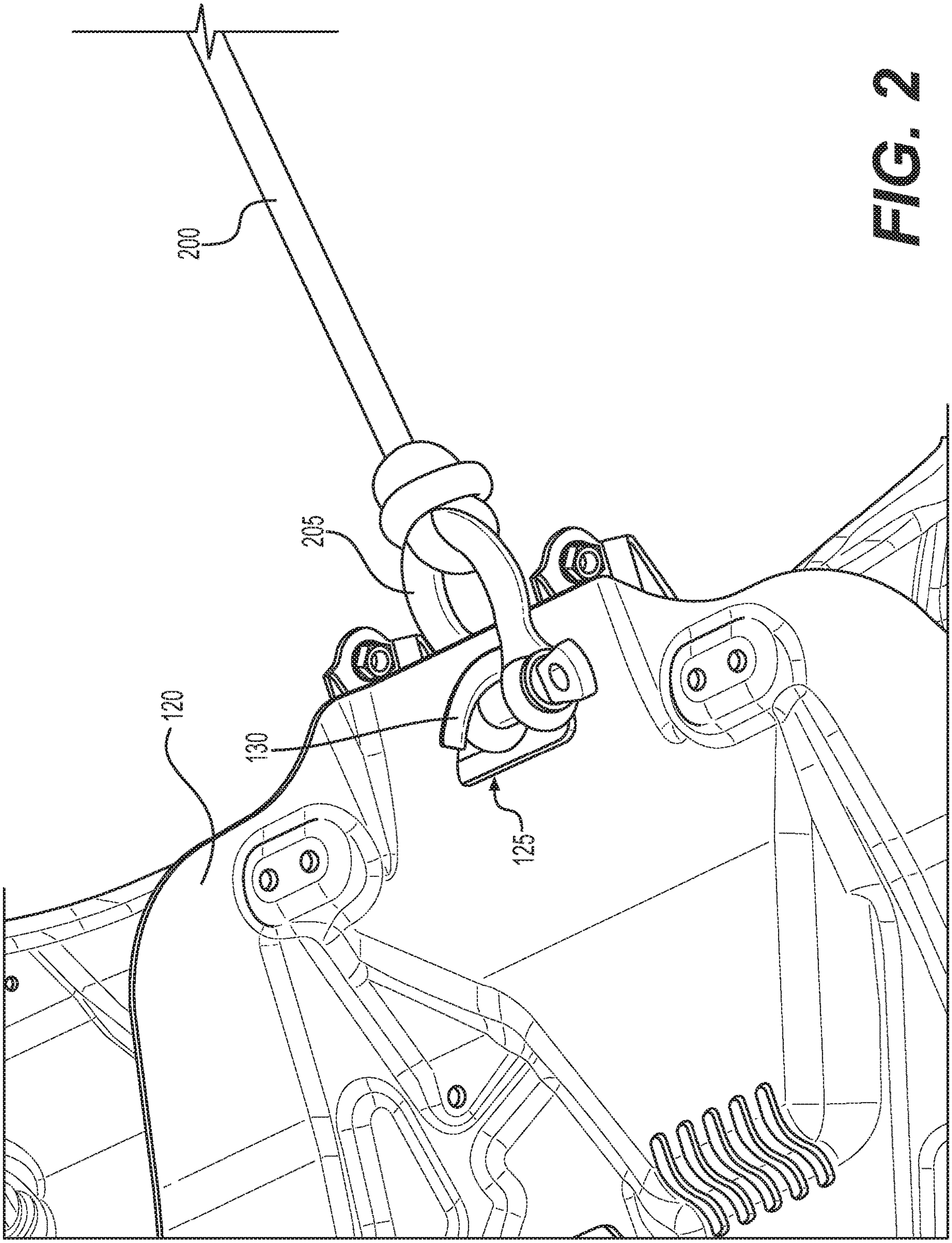
FIG. 2 shows a schematic close-up view of a recovery portion of the skid plate shown in FIG. 1.

FIG. 2 shows a schematic close-up view of a recovery portion of the skid plate shown in FIG. 1. As shown in FIG. 2, recovery equipment may be attached to skid plate 120 through recovery opening 125. For example, as shown in FIG. 2, a rope 200 and a D-ring 205 may be attached to skid plate 120 through recovery opening 125. In the event a vehicle to which skid plate 120 is attached becomes disabled or stuck, rope 200 may be pulled (e.g., by another vehicle) in order to recover the vehicle without damaging the vehicle. Again, alternatively, the vehicle to which skid plate 120 is attached may be used as the recovery vehicle to recover the other vehicle.

Figure 3:
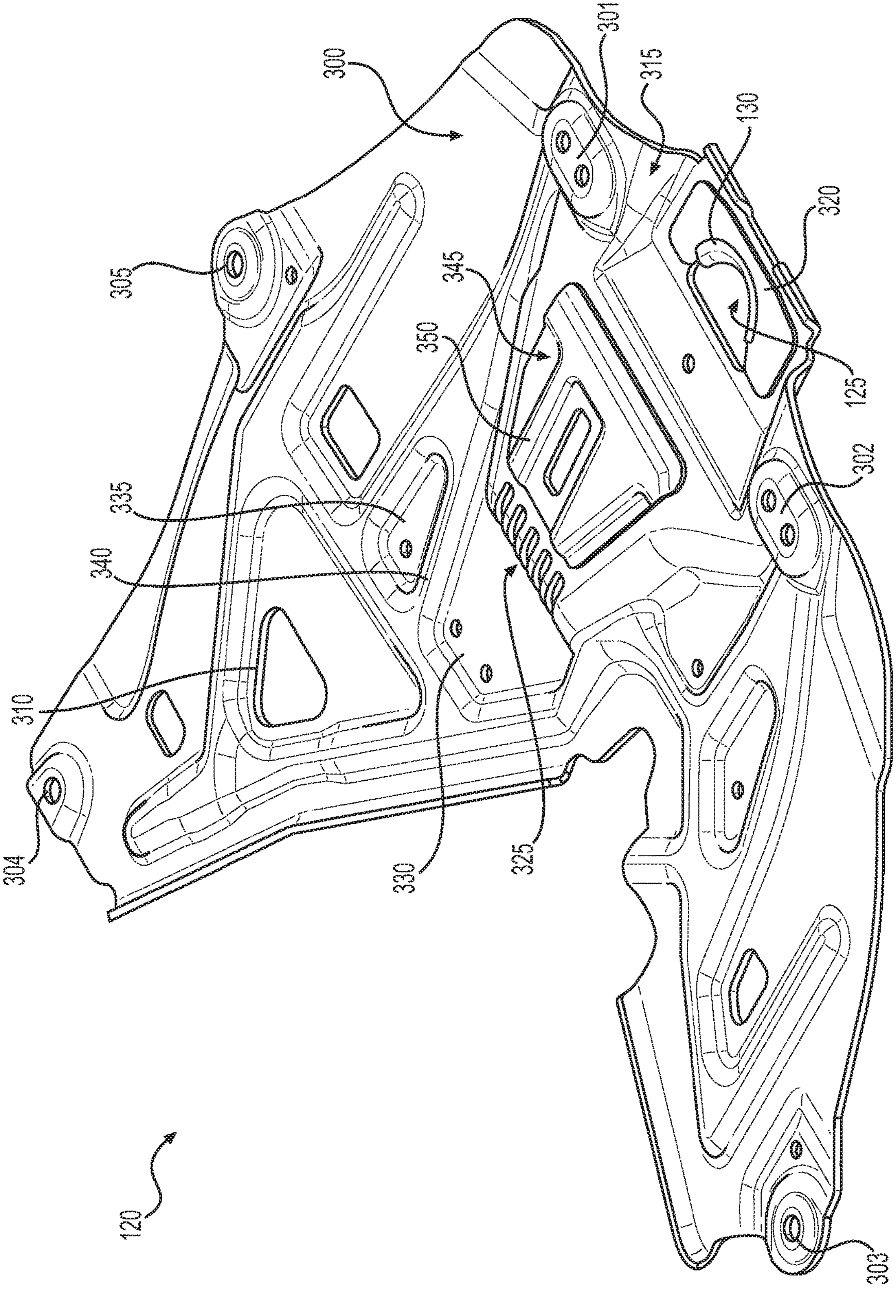
FIG. 3 shows a schematic top view of the skid plate shown in FIG. 1.

FIG. 3 shows a schematic top view of the skid plate shown in FIG. 1. As shown in FIG. 3, skid plate 120 may include a continuous unitary plate of material. The continuous unitary plate may include a plurality of mounting points configured for mounting the continuous unitary plate to an undercarriage of a vehicle. For example, skid plate 120 may include a first mounting point 301, a second mounting point 302, a third mounting point 303, a fourth mounting point 304, and a fifth mounting point 305. As shown in FIG. 3, in some embodiments, these mounting points may each include one or more holes configured to receive a bolt or other fastener in order to removably attach skid plate 120 to the undercarriage of the vehicle. In other embodiments, skid plate 120 may be fixedly attached to the undercarriage of the vehicle, for example by welding.

As also shown in FIG. 3, in some embodiments, recovery opening 125 may be disposed proximate an outer edge of the continuous unitary plate. FIG. 3 also provides an additional view of edge liner 130 associated with recovery opening 125. Further, as also shown in FIG. 3, skid plate 120 may include a first reinforcing plate 320 fixedly attached to the continuous unitary plate (e.g., by welding) proximate recovery opening 125.

As shown in FIG. 3, top surface 300 of skid plate 120 may include a plurality of raised portions and a plurality of depressions. These raised portions and depressions may provide reinforcement to skid plate 120 without requiring additional material to be added to the continuous unitary plate in most areas. In some cases, depressions may be configured to be associated with certain undercarriage components. For example, a first depression 330 may be configured to be associated with the transmission of the vehicle to which skid plate 120 is mounted. A second depression 335 is also illustrated, with a raised portion (in this case a rib or bead 340) disposed between first depression 330 and second depression 335.

In some embodiments, the skid plate may include a plurality of vent openings configured to provide cooling for a component of the undercarriage of the vehicle. For example, as shown in FIG. 3, skid plate 120 may include a plurality of vent openings 325. Vent openings 325 may be configured to provide ventilation for the transmission that resides above first depression 330 when skid plate 120 is installed on the vehicle.

Also, in addition to the beads, additional reinforcement may be provided to portions of skid plate 120. For example, in some embodiments, one or more reinforcing plates may be fixedly attached to the continuous unitary plate that forms the majority of skid plate 120. For example, as shown in FIG. 3, skid plate 120 may include a second reinforcing plate 345. As further shown in FIG. 3, second reinforcing plate 345 may include one or more beads 350 to provide additional strength. In some cases, second reinforcing plate 345 may be utilized for reinforcement instead of stamping beads into the continuous unitary plate in the central area proximate vent openings 325.

While beads in this area could provide reinforcement, the undulations on the underside of skid plate 120 in this area could disrupt airflow before reaching vent openings 325. Accordingly, the continuous unitary plate is left as substantially planar in this region with the underside substantially smooth, and a ribbed plate 345 is fixedly attached (e.g., welded) to the continuous unitary plate on the upper side opposite the substantially smooth region on the bottom side of the plate.

In some embodiments, the recovery opening may be disposed in a recovery portion of the continuous unitary plate that is angled downward from portions of the continuous unitary plate surrounding the recovery portion. This may provide greater clearance between the recovery portion of the skid plate and the undercarriage of the vehicle, which may facilitate passing recovery equipment (e.g., a rope, cable, hook, or D-ring) through the recovery opening. For example, as shown in FIG. 3, skid plate 120 may include a recovery portion 315 that is angled downward from surrounding portions of the continuous unitary plate.

Figure 4:
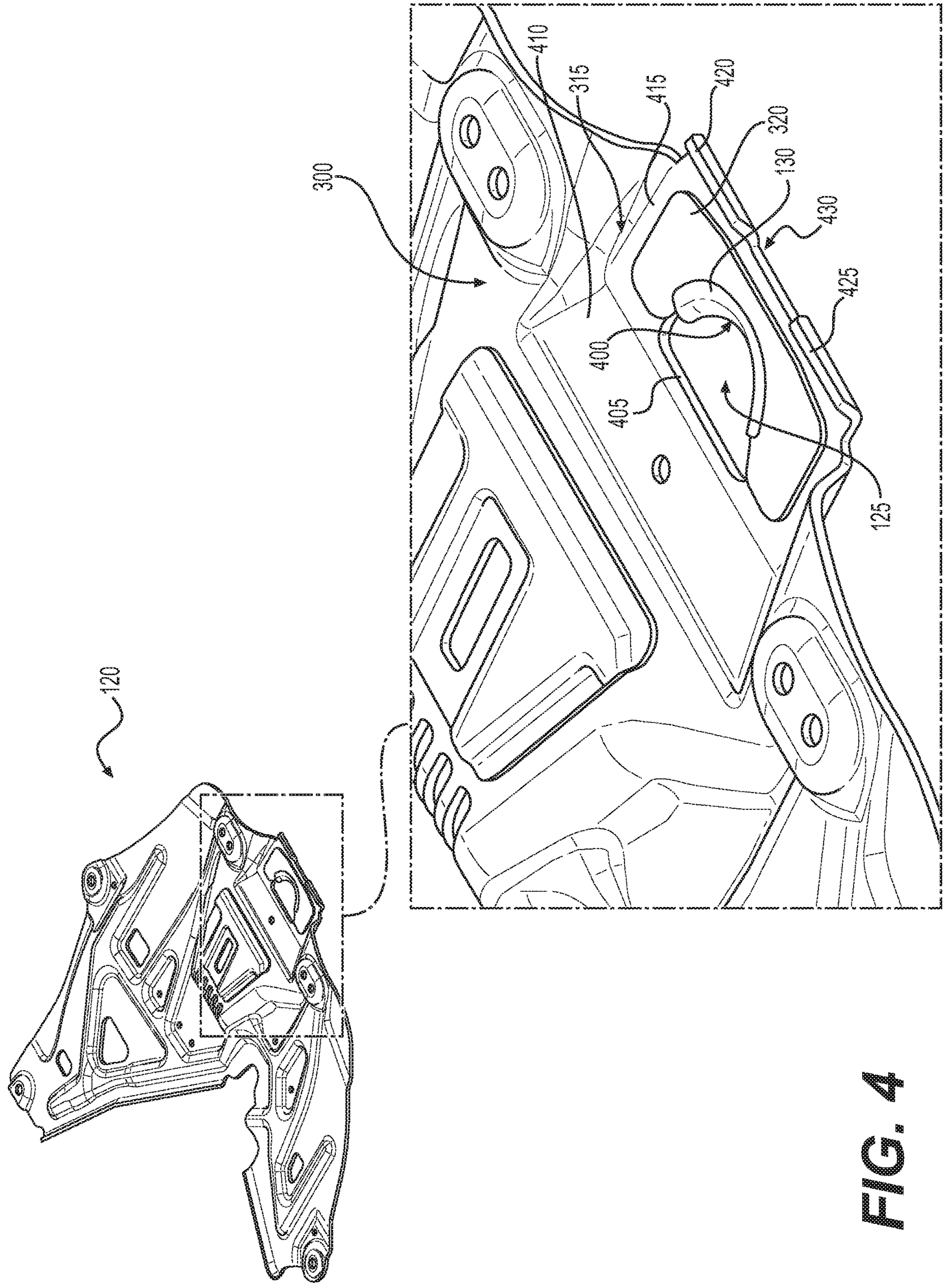
FIG. 4 shows a schematic top view with an enlarged view of the recovery portion of the skid plate shown from the perspective illustrated in FIG. 3.

FIG. 4 shows a schematic top view with an enlarged view of the recovery portion of the skid plate shown from the perspective illustrated in FIG. 3. As shown in FIG. 4, recovery portion 315 may include a first angled wall 410. In addition, recovery portion 315 may include a substantially level surface 415 in which recovery opening 125 is disposed. That is, skid plate 120 may be configured such that surface 415 is substantially level with the ground when skid plate 120 is installed on a vehicle. This level orientation of surface 415 may facilitate distribution of loads during recovery.

As also shown in FIG. 4, in some embodiments, recovery opening 125 may have a substantially straight edge 405 and a rounded edge 400 such that recovery opening 125 is substantially D-shaped. Rounded edge 400 may be disposed closest to the outer edge of the continuous unitary plate and may facilitate recovery from a range of angles. For example, in some embodiments, recovery opening 125 may be configured for recovery from at least a 30 degree angle relative to center. That is, in such configurations, recovery opening 125 may be configured for recovery over a complete range of at least 60 degrees. As further shown, rounded edge 400 includes edge liner 130, which is substantially smooth and wrapped around at least a portion of a peripheral edge of recovery opening 125.

In addition, in some embodiments, the outer edge of the continuous unitary plate proximate the recovery opening may have at least one upwardly curved lip. This may help prevent the edge of the skid plate from catching on obstacles under the vehicle. In addition, to prevent fraying of a rope or cable being used for recovery, the upwardly curved lip may have a notch in it aligned with the recovery opening.

As shown in FIG. 4, skid plate 120 may include a first lip portion 420 of an upwardly curved lip and a second lip portion 425 of the upwardly curved lip. First lip portion 420 and second lip portion 425 may be separated by a notch 430 to facilitate use of a recovery rope or cable.

In some embodiments, an airflow region of an underside of the continuous unitary plate aligned with the plurality of vent openings may have a substantially smooth surface. This substantially smooth surface may prevent disruption of airflow prior to entering the vent openings. In addition, in order to increase airflow through the vent openings, the plurality of vent openings may be disposed on a transition between two levels of the continuous unitary plate. That is, the upstream portion of the plate may be disposed at one height, and the downstream portion of the plate may be slightly lower and the vent openings may be disposed on the transition region between the higher and lower levels of the plate.

Figure 5:
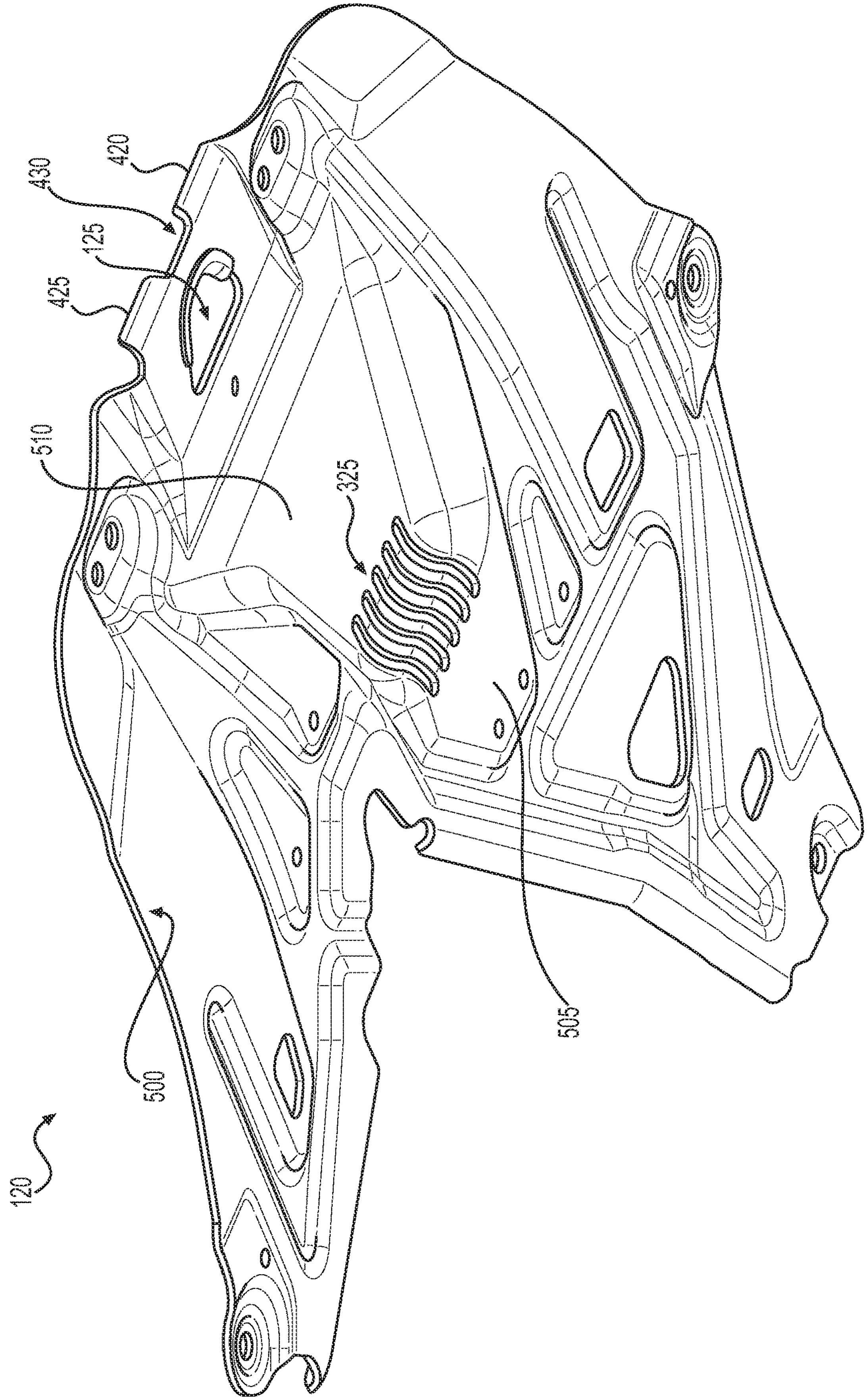
FIG. 5 shows a schematic bottom view of a skid plate according to an exemplary embodiment.

FIG. 5 shows a schematic bottom view of the skid plate shown in FIG. 1. FIG. 5 illustrates an underside 500 of skid plate 120. In particular, vent openings 325 are shown from the bottom view. As shown in FIG. 5, an airflow region 510 may have a substantially smooth bottom surface and may be provided proximate (e.g., upstream of) vent openings 325. A lower region 505 may be disposed downstream of vent openings 325. Thus, as shown in FIG. 5, vent openings 325 may be disposed in a transition region between airflow region 510 and lower region 505.

Figure 6:
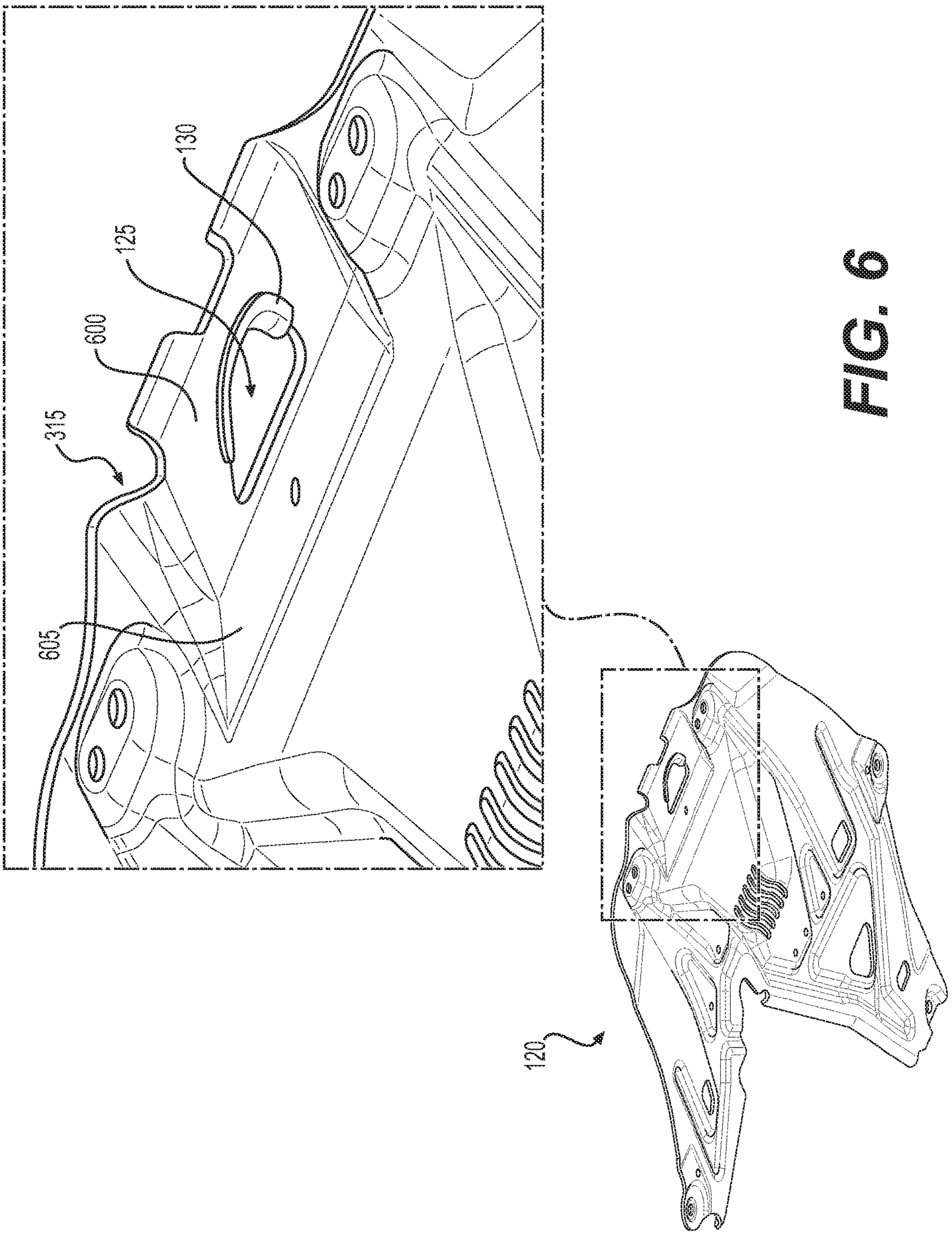
FIG. 6 shows a schematic bottom view with an enlarged view of the recovery portion of the skid plate shown from the perspective illustrated in FIG. 5.

FIG. 6 shows a schematic bottom view with an enlarged view of the recovery portion of the skid plate shown in FIG. 5. As shown in FIG. 6, recovery region 315 may include a substantially level lower surface 600 and an angled surface 605. Even though recovery region 315 is generally angled downward, substantially level lower surface 600 may, by virtue of being substantially level, minimize the extent to which the angled recovery region 315 may stick downward and catch on obstacles.

Figure 7:
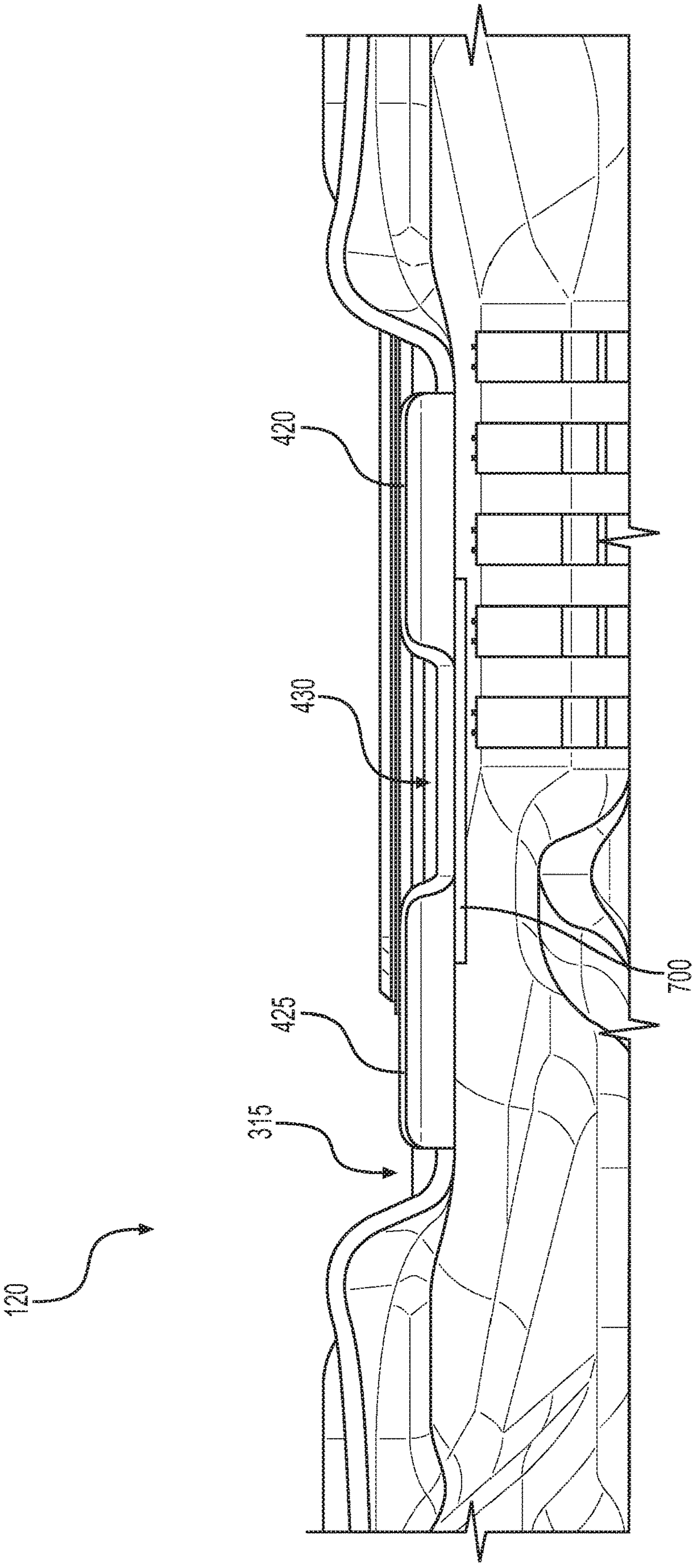
FIG. 7 shows a schematic end view of the skid plate shown in FIG. 1.

FIG. 7 shows a schematic end view of the skid plate shown in FIG. 1. FIG. 7 shows a bottom portion 700 of the edge liner in the recovery opening. In addition, FIG. 7 shows a side view of first lip portion 420, second lip portion 425, and notch 430.

Figure 8:
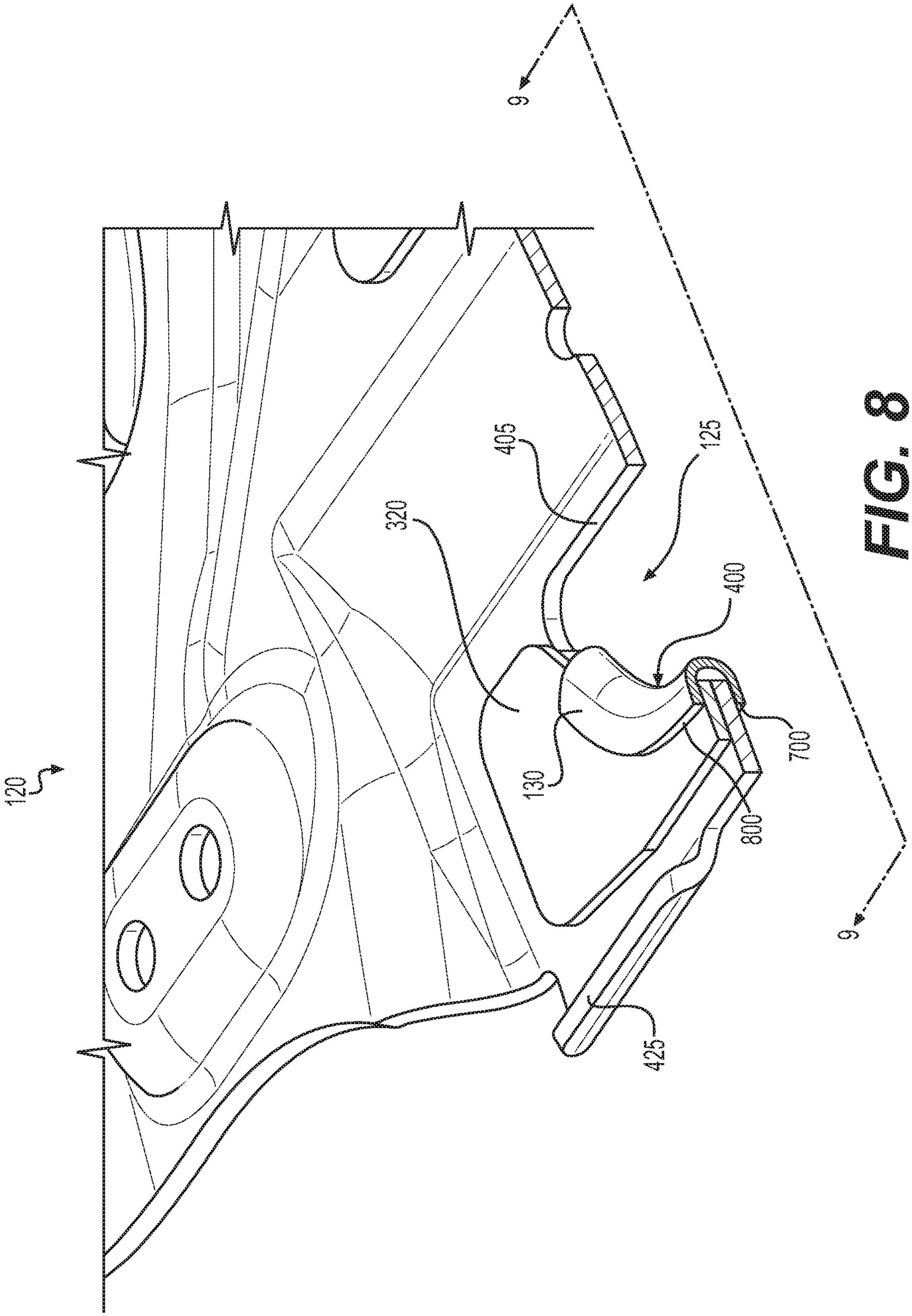
FIG. 8 shows a schematic perspective cutaway cross-sectional view of the recovery portion of the skid plate shown in FIG. 1.

FIG. 8 shows a schematic perspective cutaway cross-sectional view of the recovery portion of the skid plate shown in FIG. 1. As shown in FIG. 8, edge liner 130 may wrap around curved edge 400 of recovery opening 125. Thus, in addition to bottom portion 700, edge liner 130 may also have a top portion 800. FIG. 8 also shows a different perspective of reinforcing plate 320.

Figure 9:
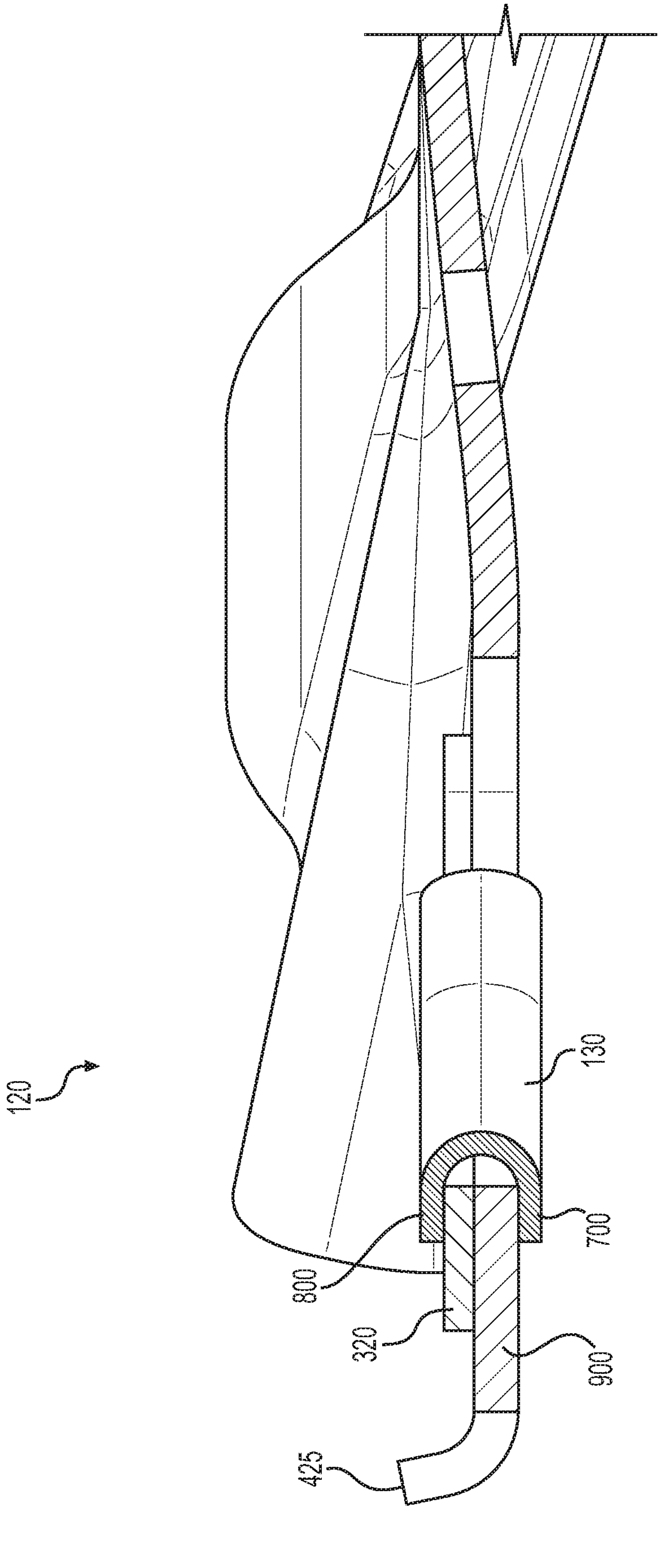
FIG. 9 shows a schematic side cutaway cross-sectional view of the recovery portion of the skid plate shown from the perspective illustrated by line 9-9 in FIG. 8.

FIG. 9 shows a schematic side cutaway cross-sectional view of the recovery portion of the skid plate from the perspective illustrated by line 9-9 in FIG. 8. Again, edge liner 130 may include a bottom portion 700 and a top portion 800. As shown in FIG. 9, top portion 800 may also wrap around reinforcing plate 320. This may prevent fraying or other damage to recovery equipment. In addition, this may help to distribute loads between the continuous unitary plate (a portion of which is illustrated by element 900 in FIG. 9) and reinforcing plate 320.

While various embodiments of the invention have been described, the description is intended to be exemplary, rather than limiting and it will be apparent to those of ordinary skill in the art that many more embodiments and implementations are possible that are within the scope of the invention. Any element of any embodiment may be substituted for another element of any other embodiment or added to another embodiment except where specifically excluded. Accordingly, the invention is not to be restricted except in light of the attached claims and their equivalents. Also, various modifications and changes may be made within the scope of the attached claims.

The invention claimed is:

1. A skid plate for a vehicle, comprising:
a continuous unitary plate of material including:
a plurality of mounting points configured for mounting the continuous unitary plate to an undercarriage of a vehicle; and
a recovery opening proximate an outer edge of the continuous unitary plate and configured to receive a recovery device,
wherein the outer edge has two upwardly curved lips separated by a notch aligned with the recovery opening.

2. The skid plate of claim 1, wherein the recovery opening has a substantially straight edge and a rounded edge such that the recovery opening is substantially D-shaped.

3. The skid plate of claim 2, wherein the rounded edge of the recovery opening is disposed closest to the outer edge of the continuous unitary plate.

4. The skid plate of claim 1, further including an edge liner that is substantially smooth and wrapped around at least a portion of a peripheral edge of the recovery opening.

5. The skid plate of claim 1, further including a reinforcing plate fixedly attached to the continuous unitary plate proximate the recovery opening.

6. The skid plate of claim 1, wherein the recovery opening is disposed in a recovery portion of the continuous unitary plate, the recovery portion including at least one wall that is angled downward from portions of the continuous unitary plate surrounding the recovery portion to a substantially level surface of the recovery portion in which the recovery opening is disposed.

7. A skid plate for a vehicle, comprising:
a continuous unitary plate of material including:
a plurality of mounting points configured for mounting the continuous unitary plate to an undercarriage of a vehicle;
a recovery opening configured to receive a recovery device; and
an edge liner including a top portion directly over the continuous unitary plate and a bottom portion directly under the continuous unitary plate, the top portion and the bottom portion connected by a rounded edge, wherein the edge liner is wrapped around at least a portion of a peripheral edge of the recovery opening.

8. The skid plate of claim 7, wherein the recovery opening has a substantially straight edge and a rounded edge such that the recovery opening is substantially D-shaped.

9. The skid plate of claim 8, wherein the rounded edge of the recovery opening is disposed closest to an outer edge of the continuous unitary plate.

10. The skid plate of claim 7, further including a reinforcing plate fixedly attached to the continuous unitary plate proximate the recovery opening.

11. The skid plate of claim 7, wherein the recovery opening is disposed in a recovery portion of the continuous unitary plate, the recovery portion including at least one wall that is angled downward from portions of the continuous unitary plate surrounding the recovery portion to a substantially level surface of the recovery portion in which the recovery opening is disposed.

12. The skid plate of claim 7, wherein the recovery opening is disposed in a recovery portion of the continuous unitary plate, and wherein an outer edge of the continuous unitary plate in the recovery portion has at least one upwardly curved lip.

13. The skid plate of claim 12, wherein the outer edge has two upwardly curved lips separated by a notch aligned with the recovery opening.

14. A skid plate for a vehicle, comprising:

a continuous unitary plate of material including:

a plurality of mounting points configured for mounting the continuous unitary plate to an undercarriage of a vehicle; and a recovery opening configured to receive a recovery device; and a plurality of vent openings configured to provide cooling for a component of the undercarriage of the vehicle.

15. The skid plate of claim 14, wherein an airflow region of an underside of the continuous unitary plate aligned with the plurality of vent openings has a substantially smooth surface.

16. The skid plate of claim 15, further including a reinforcing plate fixedly attached to a top surface of the continuous unitary plate opposite the substantially smooth surface in the airflow region.

17. The skid plate of claim 16, wherein the reinforcing plate includes one or more reinforcing beads.

18. The skid plate of claim 14, wherein the plurality of vent openings are disposed on transition between two levels of the continuous unitary plate.

* * * * *